United States Patent
Liu

(10) Patent No.: US 12,023,701 B2
(45) Date of Patent: Jul. 2, 2024

(54) ENERGY GATHERING DEVICE AND ULTRASONIC HUMIDIFIER

(71) Applicant: ZHONGSHAN STYLE ELECTRIC APPLIANCES TECHNOLOGY CO., LTD, Zhongshan (CN)

(72) Inventor: Tao Liu, Zhongshan (CN)

(*) Notice: Subject to any disclaimer, the term of this patent is extended or adjusted under 35 U.S.C. 154(b) by 489 days.

(21) Appl. No.: 17/399,073

(22) Filed: Aug. 11, 2021

(65) Prior Publication Data
US 2022/0362793 A1    Nov. 17, 2022

(30) Foreign Application Priority Data
May 13, 2021    (CN) .......................... 202121025649.0

(51) Int. Cl.
*B05B 17/06*    (2006.01)
*F24F 6/00*    (2006.01)
*F24F 6/14*    (2006.01)

(52) U.S. Cl.
CPC ............ B05B 17/0653 (2013.01); F24F 6/14 (2013.01); *F24F 2006/008* (2013.01)

(58) Field of Classification Search
CPC ............ B05B 17/0653; B05B 17/0646; B05B 17/0615; F24F 6/16; F24F 2006/008; F24F 6/14

See application file for complete search history.

(56) References Cited

U.S. PATENT DOCUMENTS

| | | | | |
|---|---|---|---|---|
| 3,352,497 | A * | 11/1967 | Abramson | B05B 9/0861 239/332 |
| 8,136,478 | B2 * | 3/2012 | Buchner | B05B 17/0615 118/695 |
| 9,776,144 | B1 * | 10/2017 | Lu | F24F 11/0008 |
| 10,273,167 | B1 * | 4/2019 | Sherry | C02F 1/043 |
| 11,458,500 | B2 * | 10/2022 | Lee | B05B 3/022 |
| 2003/0197068 | A1 * | 10/2003 | Abate | A61M 11/06 239/338 |
| 2011/0309160 | A1 * | 12/2011 | Kazem | F24F 6/16 239/231 |
| 2013/0113341 | A1 * | 5/2013 | Liu | F24F 6/12 310/348 |
| 2016/0318059 | A1 * | 11/2016 | Osborn | F21V 29/74 |
| 2017/0281821 | A1 * | 10/2017 | Davis, II | B05B 17/0607 |
| 2018/0326445 | A1 * | 11/2018 | Wang | B05B 17/0615 |
| 2019/0063768 | A1 * | 2/2019 | Chen | F24F 11/88 |

(Continued)

*Primary Examiner* — Joseph A Greenlund
(74) *Attorney, Agent, or Firm* — Daniel M. Cohn; Howard M. Cohn

(57) ABSTRACT

An energy gathering device and an ultrasonic humidifier relate to a field of humidifier technology. The energy gathering device includes an energy gathering tube and an energy gathering floating body. The energy gathering device is arranged in a mist outlet tube. The mist outlet tube is disposed inside a water tank of an ultrasonic humidifier. The energy gathering floating body includes an energy gathering cavity. A first end of the energy gathering cavity is communicated with a second end of the energy gathering cavity. An extension direction of the energy gathering cavity is same as an extension direction of a tube cavity of the mist outlet tube. The energy gathering tube is fixed in the energy gathering cavity. A tube cavity of the energy gathering tube is communicated with the energy gathering cavity of the energy gathering floating body.

7 Claims, 2 Drawing Sheets

(56) References Cited

U.S. PATENT DOCUMENTS

| | | | | |
|---|---|---|---|---|
| 2019/0321849 A1* | 10/2019 | Zu | ............................ | F24F 13/24 |
| 2020/0096213 A1* | 3/2020 | Liang | ........................ | F24F 6/12 |
| 2020/0393149 A1* | 12/2020 | Yang | ........................ | F24F 6/14 |
| 2021/0018194 A1* | 1/2021 | Liu | ........................ | F24F 6/025 |
| 2021/0187538 A1* | 6/2021 | Hu | ........................ | A61L 9/122 |
| 2022/0055061 A1* | 2/2022 | Lee | .................... | B05B 17/0676 |
| 2022/0105284 A1* | 4/2022 | Lahoud | .................. | A24F 40/48 |
| 2022/0110362 A1* | 4/2022 | Lahoud | .................. | A24F 40/44 |
| 2022/0240589 A1* | 8/2022 | Liu | ........................ | A24F 40/05 |
| 2022/0252445 A1* | 8/2022 | Sakai | ................. | B05B 17/0607 |
| 2022/0362793 A1* | 11/2022 | Liu | ........................ | F24F 6/14 |
| 2023/0228431 A1* | 7/2023 | Chen | ....................... | F24F 6/025 |
| | | | | 392/405 |

* cited by examiner

ENERGY GATHERING DEVICE AND ULTRASONIC HUMIDIFIER

TECHNICAL FIELD

The present disclosure relates to a field of humidifier technology, and in particular to an energy gathering device and an ultrasonic humidifier.

BACKGROUND

Conventional ultrasonic humidifiers always have a mist tube disposed in a water tank. An energy gathering device, also called an energy gathering float or an energy gathering floating body, is disposed in the mist tube. The energy gathering floating body moves up and down along the mist tube under buoyancy of water, and a position of the energy gathering floating body changes up and down with a depth of the water, which performs an energy-gathering effect. When the water level is low, the energy generated by an ultrasonic generating component is too large, and it is easy to break down the energy gathering floating body, which shortens a service life of the energy gathering floating body in the market and weakens a humidification effect of the ultrasonic humidifier.

SUMMARY

An object of the present disclosure is to provide an energy gathering device and an ultrasonic humidifier to solve problems in the prior art that when water level is low, energy generated by an ultrasonic generating component is too large, and it is easy to break down a conventional energy gathering floating body, which shortens a service life of the energy gathering floating body and weakens a humidification effect of the ultrasonic humidifier.

In order to achieve the object, the present disclosure provides an energy gathering device. The energy gathering device comprises an energy gathering tube and an energy gathering floating body. The energy gathering device is arranged in a mist outlet tube. The mist outlet tube is disposed inside a water tank of an ultrasonic humidifier. The energy gathering floating body comprises an energy gathering cavity. A first end of the energy gathering cavity is communicated with a second end of the energy gathering cavity. An extension direction of the energy gathering cavity is same as an extension direction of a tube cavity of the mist outlet tube. The energy gathering tube is fixed in the energy gathering cavity. A tube cavity of the energy gathering tube is communicated with the energy gathering cavity of the energy gathering floating body.

Optionally, the energy gathering tube is made of metal material or non-plastic materials.

Optionally, the energy gathering floating body comprises a first floating plate, a second floating plate, a connecting column, and a protective tube. A first end of the connecting column is connected to a surface of the first floating plate and a second end of the connecting column is connected to a surface of the second floating plate. Central lines of the first floating plate, the second floating plate, and the connecting column are same. A through cavity is disposed along the central lines of the first floating plate, the second floating plate, and the connecting column. The protective tube is fixed in the through cavity. The energy gathering cavity is a tube cavity of the protective tube.

Optionally, a safe space is defined between an inner wall of the connecting column and an outer wall of the protective tube.

Optionally, the energy gathering floating body comprises a plurality of inner ribs. Each of the inner ribs is disposed in the safe space. A first end of each of the inner ribs is connected to the connecting column and a second end of each of the inner ribs is connected to the protective tube. The inner ribs are evenly disposed on a peripheral side of the protective tube at intervals.

Optionally, the energy gathering floating body further comprises a plurality of outer ribs. Each of the outer ribs is connected to an outer sidewall of the connecting column. The outer ribs divergently extend around a peripheral side of the connecting column. An upper end of each of the outer ribs is connected to the first floating plate and a lower end of each of the outer ribs is connected to the second floating plate.

Optionally, the protective tube, the first floating plate, the connecting column, the second floating plate, the inner ribs and the outer ribs are integrally formed.

Optionally, the energy gathering floating body is a floating body made of plastic material.

Optionally, at least one annular silicone gasket is disposed on an upper end surface of the energy gathering floating body and/or a lower end surface of the energy gathering floating body.

The present disclosure further provides an ultrasonic humidifier. The ultrasonic humidifier comprises a water tank, a mist outlet tube disposed inside the water tank, an ultrasonic atomization device disposed on a bottom portion of the mist outlet tube, and the energy gathering device described above.

The energy gathering device is arranged in the mist outlet tube. The energy gathering device floats with changes of water level in the mist outlet tube. The tube cavity of the energy gathering tube of the energy gathering device is communicated with the tube cavity of the mist outlet tube. The tube cavity of the energy gathering tube is opposite to the ultrasonic atomization device.

In the energy gathering device and the ultrasonic humidifier of the present disclosure, the energy gathering floating body comprises the through energy gathering cavity, the energy gathering tube is disposed in the energy gathering cavity, and the tube cavity of the energy gathering tube is communicated with the energy gathering cavity of the energy gathering floating body. The energy gathering cavity is communicated with the mist outlet tube and the extension direction of the energy gathering cavity is same as the extension direction of the mist outlet tube. Thus, the tube cavity of the energy gathering tube is opposite to the ultrasonic atomization device. Since ultrasonic energy generated by the ultrasonic atomization device is relatively large, the energy gathering tube collects the generated ultrasonic energy, protects the energy gathering floating body from being broken down by the ultrasonic energy, and avoids destroying the energy gathering floating body, which effectively improves a service life of the energy gathering floating body. Moreover, through the energy gathering device, when the water level is deep, the ultrasonic humidifier is still able to achieve stable atomization and humidification effects.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

In the drawings.

| | | | |
|---|---|---|---|
| Energy gathering device | 100 | Energy gathering tube | 110 |
| Energy gathering floating body | 120 | Energy gathering cavity | 101 |
| annular positioning inclined surface | 102 | First floating plate | 121 |
| Second floating body | 122 | Connecting column | 123 |
| Protective tube | 124 | Through cavity | 103 |
| Safe space | 104 | Inner rib | 125 |
| Outer rib | 126 | | |

DETAILED DESCRIPTION

In order to make the purpose, technical solutions, and advantages of the present disclosure clear, the following further describes the present disclosure in detail with reference to accompanying drawings and embodiments. It should be understood that the specific embodiments described herein are only used to explain the present disclosure, and are not intended to limit the present disclosure.

It should be noted that when a component is referred to as being "fixed to" or "installed on" the other component, the component can be directly disposed on the other component or it may be indirectly fixed or disposed on the other component through a third component. When the component is "connected to" the other component, the component may be directly connected to the other component or it may be indirectly connected to the other component through a third component.

It should be understood in the description of the present disclosure that terms such as "length", "width", "upper", "lower", "front", "rear", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present disclosure, the meaning of "a plurality of" is two or more unless otherwise specified.

Figure 1:
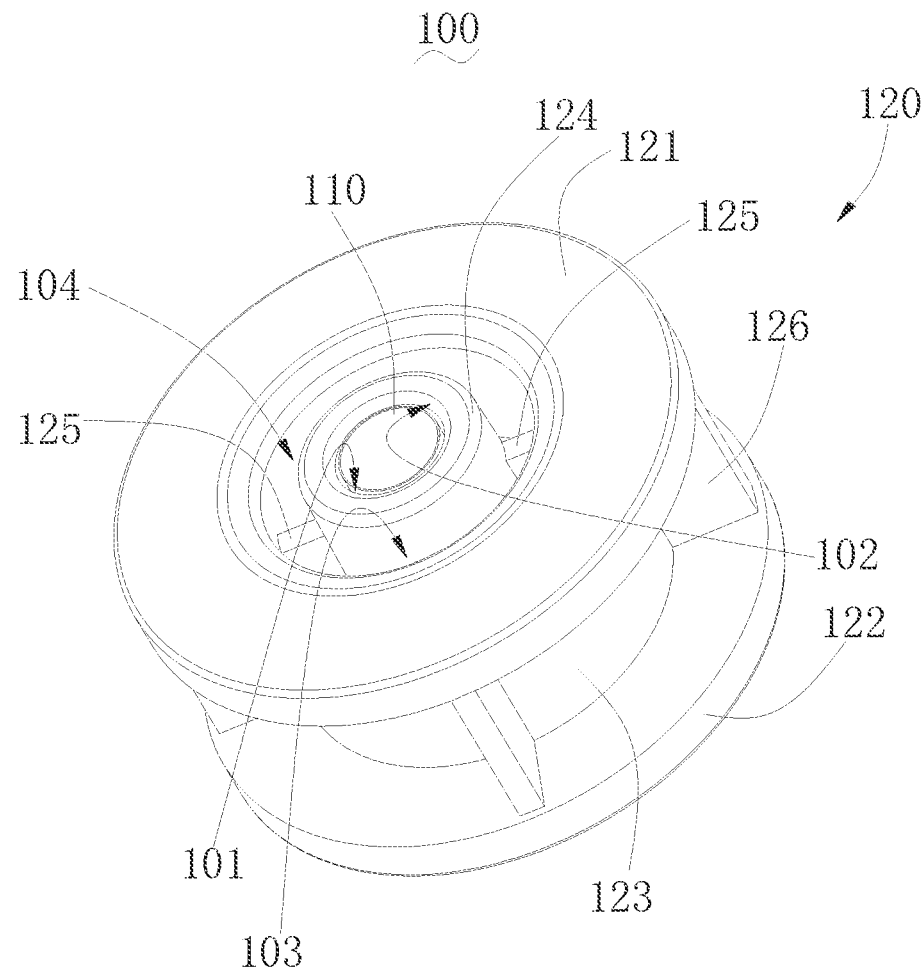
FIG. 1 is a perspective schematic diagram of an energy gathering device according to one embodiment of the present disclosure.
Figure 2:
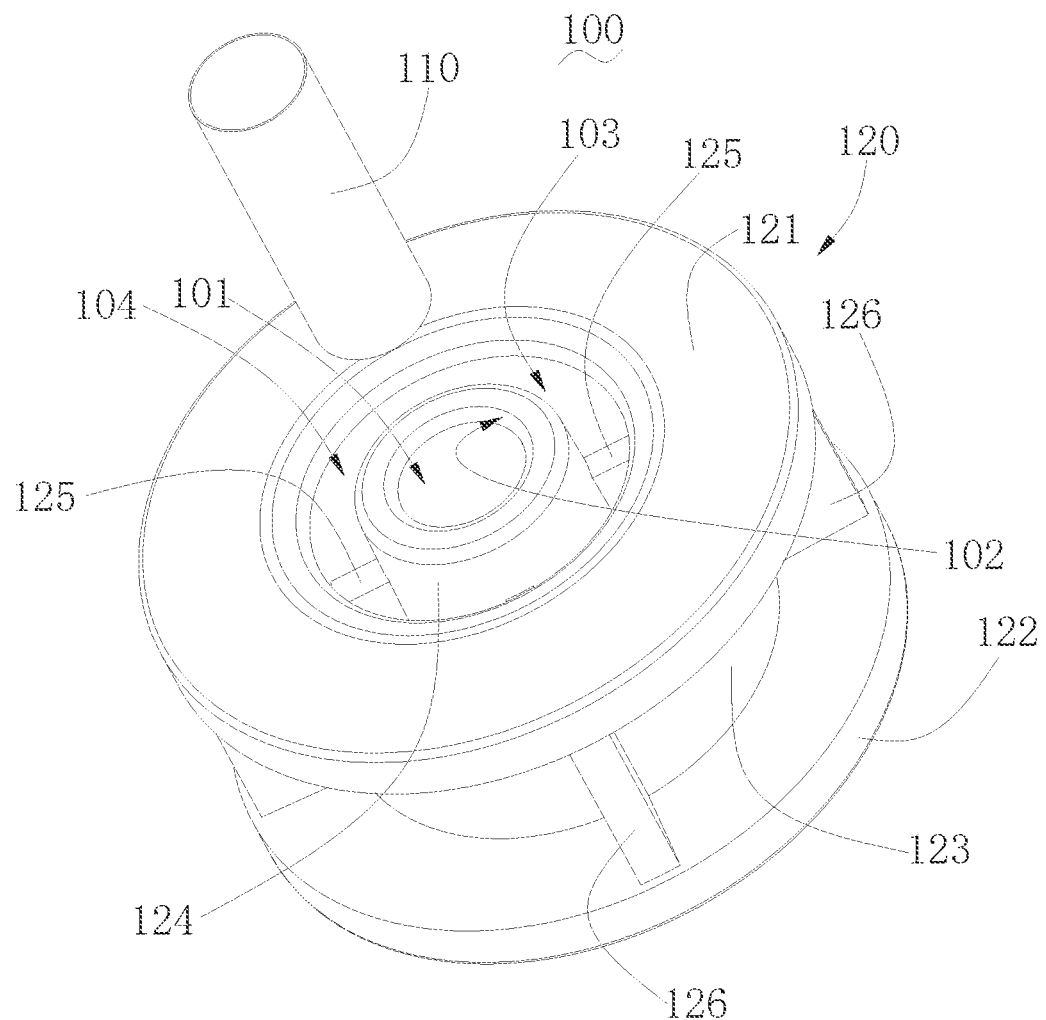
FIG. 2 is an exploded schematic diagram of the energy gathering device according to one embodiment of the present disclosure.

As shown in FIGS. 1 and 2, the present disclosure provides an energy gathering device 100. The energy gathering device 100 is arranged in a mist outlet tube (not shown in the drawings). The mist outlet tube is disposed inside a water tank of an ultrasonic humidifier. A first end of the mist outlet tube faces a mist outlet of the water tank. A second end of the mist outlet tube faces an ultrasonic atomization device. The energy gathering device 100 comprises an energy gathering tube 110 and an energy gathering floating body 120. The energy gathering tube 110 has an energy gathering effect. The energy gathering floating body 120 receives the energy gathering tube 110, floats in the mist outlet tube, and moves up and down along the mist outlet tube as a water level in the mist outlet tube changes.

The energy gathering floating body 120 comprises an energy gathering cavity 101. A first end of the energy gathering cavity 101 is communicated with a second end of the energy gathering cavity 101. An extension direction of the energy gathering cavity 101 is same as an extension direction of a tube cavity of the mist outlet tube. The energy gathering tube 110 is fixed in the energy gathering cavity 101. Specifically, the energy gathering tube 110 is fixed in the energy gathering cavity 101 by an interference fit. A tube cavity of the energy gathering tube 110 is communicated with the energy gathering cavity 101 of the energy gathering floating body 120.

In the embodiment, the energy gathering cavity 101 is a through energy gathering cavity 101. The energy gathering floating body 120 comprises the through energy gathering cavity 101, the energy gathering tube 110 is disposed in the energy gathering cavity 101, and the tube cavity of the energy gathering tube 110 is communicated with the energy gathering cavity 101 of the energy gathering floating body 120. The energy gathering cavity 101 is communicated with the mist outlet tube and the extension direction of the energy gathering cavity 101 is same as the extension direction of the mist outlet tube. Thus, the tube cavity of the energy gathering tube 110 is opposite to the ultrasonic atomization device. Since ultrasonic energy generated by the ultrasonic atomization device is relatively large, the energy gathering tube collects the generated ultrasonic energy, protects the energy gathering floating body 120 from being broken down by the ultrasonic energy, and avoids destroying the energy gathering floating body 120, which effectively improves a service life of the energy gathering floating body 120. Moreover, through the energy gathering device 100, when the water level is deep, the ultrasonic humidifier is still able to achieve stable atomization and humidification effects.

Optionally, the energy gathering tube 110 is made of metal material or non-plastic materials. Because the energy gathering tube made of plastic materials has poor stability and is easier to be broken down. The materials of the energy gathering tube used in the embodiment protects the energy gathering floating body 120 from breaking down by the ultrasonic energy. In the embodiment, the energy gathering tube 110 is made of metal material. Specifically, the energy gathering tube 110 may be made of stainless steel, aluminum, iron, copper, etc., which are not limited thereto.

In the embodiment, the energy gathering tube 110 is interference fit with the energy gathering cavity 101 of the energy gathering floating body 120. The energy gathering tube 110 is able to be pressed into the energy gathering cavity 101 by an external force.

In the embodiment, the energy gathering floating body 120 comprises annular positioning inclined surfaces 102 at two cavity openings. Each annular positioning inclined surface 102 faces an outside of the energy gathering floating body 120. In this way, one end of the energy gathering tube 110 is quickly aligned with one cavity opening of the energy gathering cavity 101 to achieve rapid positioning and improve installation efficiency.

As shown in FIGS. 1 and 2, the energy gathering floating body 120 comprises a first floating plate 121, a second floating plate 122, a connecting column 123, and a protective tube 124. A first end of the connecting column 123 is connected to a surface of the first floating plate 121 and a second end of the connecting column 123 is connected to a surface of the second floating plate 122. Central lines of the first floating plate 121, the second floating plate 122, and the connecting column 123 are same. A through cavity 103 is disposed along the central lines of the first floating plate 121, the second floating plate 122, and the connecting column 123. The protective tube 124 is fixed in the through cavity 103. The energy gathering cavity 101 is a tube cavity of the protective tube 124.

In the embodiment, the protective tube 124 of the energy gathering floating body 120 also has an energy gathering effect. The energy gathering tube 110 is embedded in the energy gathering cavity 101 of the protective tube 124, which improves the energy gathering effect, so that the energy gathering tube 110 would not be broken down by the ultrasonic energy.

In the embodiment, the first floating plate 121 and the second floating plate 122 can be matched with the mist outlet tube. Of course, this may not be required. The cross sections of the first floating plate 121 and the second floating plate 122 may be round, square, elliptical, polygonal, etc., which are not limited thereto, only if the first floating plate 121 and the second floating plate 122 meet floating stability requirements, so as to ensure the stable mist output of the ultrasonic humidifier.

As shown in FIGS. 1 and 2, optionally, a safe space 104 is defined between an inner wall of the connecting column 123 and an outer wall of the protective tube 124.

As shown in FIGS. 1 and 2, optionally, the energy gathering floating body 120 comprises a plurality of inner ribs 125. Each of the inner ribs 125 is disposed in the safe space. A first end of each of the inner ribs 125 is connected to the connecting column 123 and a second end of each of the inner ribs 125 is connected to the protective tube 124. The inner ribs 125 are evenly disposed on a peripheral side of the protective tube 124 at intervals. Thus, an overall structural strength of the energy gathering floating body 120 is improved, and it is not easily broken down by the ultrasonic energy.

As shown in FIGS. 1 and 2, optionally, the energy gathering floating body 120 further comprises a plurality of outer ribs 126. Each of the outer ribs 126 is connected to an outer sidewall of the connecting column 123. The outer ribs 126 divergently extend around a peripheral side of the connecting column 123. An upper end of each of the outer ribs 126 is connected to the first floating plate 121 and a lower end of each of the outer ribs is connected to the second floating plate 122. Thus, the overall structural strength of the energy gathering floating body 120 is further improved, so that it is not easily broken down by the ultrasonic energy, and effect of stable atomization and humidification is achieved.

As shown in FIGS. 1 and 2, furthermore, the protective tube 124, the first floating plate 121, the connecting column 123, the second floating plate 122, the inner ribs 125 and the outer ribs 126 are integrally formed. Therefore, it is facilitate to improve processing effect and improve the overall structural strength.

Furthermore, the energy gathering floating body 120 is a floating body made of plastic material, so that the energy gathering is able to float on the water.

Optionally, at least one annular silicone gasket (not show in the drawings) is disposed on an upper end surface of the energy gathering floating body 120 and/or a lower end surface of the energy gathering floating body 120. In this way, the silicone gaskets prevent the energy gathering floating body 120 from being broken down by the ultrasonic waves, which increases the service life of the energy gathering device and the ultrasonic humidifier, and protects the energy gathering floating body 120 when the water level is relatively high or relatively low.

As shown in FIGS. 1 and 2, the present disclosure further provides an ultrasonic humidifier. The ultrasonic humidifier comprises a water tank, a mist outlet tube disposed inside the water tank, an ultrasonic atomization device disposed on a bottom portion of the mist outlet tube, and the energy gathering device 100 described above. The energy gathering device is arranged in the mist outlet tube 100. The energy gathering device 100 floats with changes of water level in the mist outlet tube. The tube cavity of the energy gathering tube 110 of the energy gathering device 100 is communicated with the tube cavity of the mist outlet tube. The tube cavity of the energy gathering tube is opposite to the ultrasonic atomization device.

In the embodiment, the mist outlet tube is disposed in the water tank of the ultrasonic humidifier. An upper opening of the mist outlet tube is opposite to the mist outlet, and the lower opening of the mist outlet tube is opposite to the ultrasonic atomization device. The \ energy gathering device 100 is disposed in the mist outlet tube, moves up and down along the mist outlet tube under the buoyancy of the water and changes a position up and down with the depth of the water to achieve an energy-gathering effect.

The energy gathering device 100 is disposed in the mist outlet tube of the ultrasonic humidifier, which on the one hand improves resistance to breakdown; on the other hand helps to achieve stable atomization and humidification effects at deep water levels. Furthermore, the energy gathering device 100 significantly increases the overall service life of the ultrasonic humidifier, and the user experience is improved. The above are only optional embodiments of the present disclosure and are not intended to limit the present disclosure. Any modification, equivalent replacement, and improvement made within the spirit and principle of the present disclosure shall fall within the protection scope of present disclosure.

What is claimed is:

1. An energy gathering device, comprising: an energy gathering tube and an energy gathering floating body; wherein the energy gathering floating body comprises an energy gathering cavity, a first end of the energy gathering cavity is communicated with a second end of the energy gathering cavity; the energy gathering tube is fixed in the energy gathering cavity; a tube cavity of the energy gathering tube is communicated with the energy gathering cavity of the energy gathering floating body;

wherein the energy gathering floating body comprises a connecting column and a protective tube; a safe space is defined between an inner wall of the connecting column and an outer wall of the protective tube; wherein the energy gathering floating body comprises a plurality of inner ribs, each of the inner ribs is disposed in the safe space; a first end of each of the inner ribs is connected to the connecting column and a second end of each of the inner ribs is connected to the protective tube; the inner ribs are evenly disposed on a peripheral side of the protective tube at intervals.

2. The energy gathering device according to claim 1, wherein the energy gathering tube is made of metal material or non-plastic materials.

3. The energy gathering device according to claim 1, wherein the energy gathering floating body comprises a first floating plate and a second floating plate a first end of the connecting column is connected to a surface of the first floating plate and a second end of the connecting column is connected to a surface of the second floating plate; central lines of the first floating plate, the second floating plate, and the connecting column are the same; a through cavity is disposed along the central lines of the first floating plate, the second floating plate; the protective tube is fixed in the through cavity; the energy gathering cavity is a tube cavity of the protective tube.

4. The energy gathering device according to claim 1, wherein the energy gathering floating body further comprises a plurality of outer ribs; each of the outer ribs is connected to an outer sidewall of the connecting column; the outer ribs divergently extend around a peripheral side of the connecting column; an upper end of each of the outer ribs is connected to the first floating plate and a lower end of each of the outer ribs is connected to the second floating plate.

5. The energy gathering device according to claim 4, wherein the protective tube, the first floating plate, the connecting column, the second floating plate, the inner ribs, and the outer ribs are integrally formed.

6. The energy gathering device according to claim 1, wherein the energy gathering floating body is a floating body made of plastic material.

7. An ultrasonic humidifier, comprising: an energy gathering device;
wherein the energy gathering device comprises an energy gathering tube and an energy gathering floating body; the energy gathering floating body comprises an energy gathering cavity; a first end of the energy gathering cavity is communicated with a second end of the energy gathering cavity; the energy gathering tube is fixed in the energy gathering cavity; a tube cavity of the energy gathering tube is communicated with the energy gathering cavity of the energy gathering floating body;
wherein the energy gathering floating body comprises a connecting column and a protective tube; a safe space is defined between an inner wall of the connecting column and an outer wall of the protective tube; wherein the energy gathering floating body comprises a plurality of inner ribs, each of the inner ribs is disposed in the safe space; a first end of each of the inner ribs is connected to the connecting column and a second end of each of the inner ribs is connected to the protective tube; the inner ribs are evenly disposed on a peripheral side of the protective tube at intervals.

* * * * *